Dec. 27, 1966     J. P. JORDAN     3,294,591

SEALED BATTERY

Filed March 30, 1964

INVENTOR
JOHN PAUL JORDAN by: Wallenstein, Spangenberg
& Hattis    ATTYS.

United States Patent Office 3,294,591
Patented Dec. 27, 1966

3,294,591
SEALED BATTERY
John Paul Jordan, Highland Park, N.J., assignor to Gulton Industries, Inc., Metuchen, N.J., a corporation of New Jersey
Filed Mar. 30, 1964, Ser. No. 355,566
5 Claims. (Cl. 136—133)

This invention relates to an improved sealed battery construction which has its most important application in battery casings utilizing electrolytes with low surface tensions, such as potassium hydroxide, which tend to leak very readily where appreciable internal casing pressures are involved, such as in rechargeable nickel-cadmium and silver-cadmium batteries. In these batteries, high internal casing pressures frequently build up during overcharge.

Rechargeable nickel-cadmium batteries have come into wide use for a variety of applications, including flashlights, toothbrushes, cigarette lighters, etc. Low price and small size are of paramount importance in these applications. Where low surface tension electrolytes are utilized with or without the presence of high internal casing pressures, the sealing of these electrolytes becomes an especially difficult problem where severe size and cost limitations are involved in the design of the battery casings.

It has been the common practice to form the battery casings of the small sized batteries of two metal parts. One of the parts is generally an open-end casing body and the other part is a cover and terminal member which is insulated from and sealed to the open-end of the casing body by means including a resilient compressible ring made of rubber, plastic, or similar material which is sandwiched between the crimped end portion of the casing body and a shoulder formed on the casing body.

The sealing ring thus serves the double function of electrically insulating the cover from the casing body and of providing a liquid tight seal therebetween. The obtainment of good electrical insulation requires a sealing ring of appreciable thickness to withstand the high pressures applied thereagainst by the crimping of the metal therearound and the presence of high internal casing pressures. If the sealing ring is too thin, the pressure of the metal between which the ring is sandwiched can puncture or otherwise destroy the insulating quality of such a sealing ring. A sealing ring of such thickness to withstand the pressures involved without puncturing or otherwise destroying the insulating ability of the sealing ring poses other problems which make the sealing of the casing a very critical operation. Thus, the degree of the compression of the sealing ring must be kept within certain limitations. If the sealing ring is compressed too much, cold flow or permanent setting of the ring material takes place which destroys the ability of the ring to perform its sealing function. If it is not compressed enough, the ring will also not form an effective seal.

One of the objects of the present invention is to provide a unique battery casing construction having an open-end casing body and a cover which construction is useful, for example, in small, relatively inexpensive rechargeable batteries utilizing low surface tension electrolytes, such as potassium hydroxide, and wherein the casing body is sealingly connected to and insulated from the terminal in a way which avoids the criticality and the unreliability of the heretofore utilized sealing ring construction described above.

Another object of the present invention is to provide said improved battery casing construction without appreciably increasing the cost thereof. A further object of the invention is to provide an improved casing construction as described above which does not require any increase in size, or significant modification of the shape, of the overall battery configuration, so that the invention can be incorporated in existing battery constructions without modification of the battery size and shape specifications for which they were designed.

The present invention utilizes a completely unconventional approach in the design of the casing cover and seal therefor and, at first glance, seems to be more complex and less desirable means for accomplishing the insulating and sealing functions referred to. Actually, however, the invention represents a substantial improvement over the insulating and sealing technique heretofore utilized in battery casing constructions. The approach of the present invention is to design the cover so that the main seal between the cover and the casing body does not have to form an insulating seal, whereby the insulating and main sealing functions are separately an independently effected in the best manner possible for each function involved. To this end, the cover is made of two metal parts forming an integral assembly which, in the assembly of the casing, is placed over the open end of a casing body and welded or otherwise secured thereto in a manner solely to provide an effective seal with the casing body, so that the joint between the cover and the casing body is not an insulating joint. The cover assembly, which is mass produced as a separate sub-component from the casing body, comprises an outer metal member and an inner metal terminal forming member secured to the outer member through an insulating joint which is impervious to the electrolyte and causes no sealing problems. In addition, as will appear, the insulating joint acts also as the securing bond between the inner and outer members of the cover assembly.

In the most advantageous form of the invention, the outer member of the cover assembly has an opening in the central portion thereof. The inner terminal forming member most advantageously has an annular outer portion which is contiguous to the inner surface of said outer member, and an outwardly projecting central portion passing through and in spaced relation to the defining edges of said opening in the outer member of the cover assembly.

The inner and outer members of the cover assembly are secured together by an insulating layer which most advantageously is neoprene rubber vulcanized in place between the inner and outer members of the cover assembly.

The insulating layer between the inner and outer members of the cover assembly is not subjected to the insulation destroying pressures of the type described above where a sealing ring is sandwiched by crimped over ends of the casing body. This is due to the fact that the central portion of the cover assembly where the electrical seal is located can be extended over a much longer surface area, thus reducing the stress per unit area. In addition, since this seal is assembled remote from the main body of the battery, it can be subjected to temperatures high enough to achieve vulcanization, which cannot be done when sealing a battery. Also, when pressure builds up in the assembled casing body the pressure applied against the inner member acts in a direction to force the inner member towards the outer member which makes the seal between inner and outer members more secure, but without hazard of puncture because of the large surface area available.

Other advantages and features of the present invention will become apparent upon making references to the specification to follow and the drawings wherein.

Figure 1:
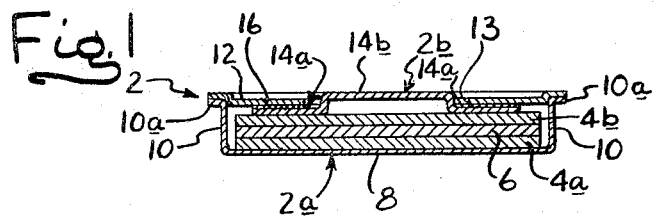
FIG. 1 is a transverse section through a small button-type rechargeable dry cell battery incorporating features of the present invention.
Figure 2:
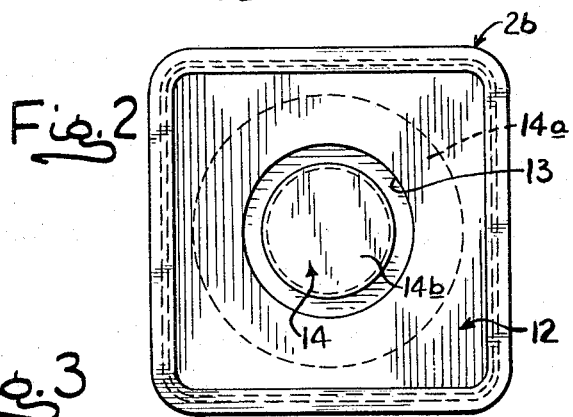
FIG. 2 is a plan view of the battery of FIG. 1.

Referring now to the drawings, as there shown the exemplary battery includes a casing 2 of rectangular shape enclosing various components making up a rechargeable battery. The components include one or more pairs of battery plates 4a and 4b between which is sandwiched a separator 6 impregnated with a suitable electrolyte. In a nickel-cadmium battery the plate 4a may comprise a porous nickel core impregnated with nickel hydroxide. The plate 4b may comprise a porous core impregnated with cadmium-hydroxide, and the electrolyte is potassium hydroxide. The battery casing 2 includes an open top metal casing body 2a whose open end is closed by a cover assembly 2b.

The casing body 2a has a bottom wall 8 extending generally parallel to the plane of the battery plates 4a and 4b. The bottom plate 4a makes electrical and physical contact with the inner surface of the bottom wall 8. The casing body has side walls 10 extending tranversely from the margins of the bottom wall 8. The inner margins of the side walls 10 define an opening in the casing body through which the battery plates 4a–4b and separator 6 are passed during the initial assembly of the battery. In a nickel-cadmium battery the casing body 2a is preferably made of a nickel-plated steel.

The illustrated cover assembly includes an outer metal member 12 having a rectangular shape which generally conforms to the shape of the casing body 10, and an inner metal terminal forming member 14. The outer member has a centrally disposed opening 13 which is preferably circular. The inner and outer members 12 and 14 are preferably made of the same material as the casing body, in the nickel-cadmium battery being described nickel-plated steel.

The outer member 12 is secured in any suitable way in sealing relationship to the side walls 10 of the casing body. As illustrated, the upper end of the casing body 10 is turned outwardly at 10a to form a horizontal shoulder on which the correspondingly shaped perimeter of member 12 is connected and sealed as by welding. A welded joint forms an effective easy to apply joint. In the alternative, the outer member 12 could be sealed to the casing body by crimping the side walls 10 (not shown), around the edges of the outer member. A thin rubber-like gasket about 0.004 inch thick (a thickness here incapable of acting as a reliable insulator) is preferably sandwiched between the crimped side walls and the outer member 12.

The illustrated inner terminal forming member 14 has a circular annular outer portion 14a which underlies the outer member and has a diameter substantially less than the inner dimension of the casing body so as to be spaced from the side walls 10 thereof when the cover assembly is in place thereon. The outer annular portion 14a of the inner terminal forming member 14 terminates in an outwardly projecting cylindrically shaped dome portion 14b which passes through and in spaced relation to the defining edges of, the opening 13 in the outer member 12 of the cover assembly.

Figure 3:
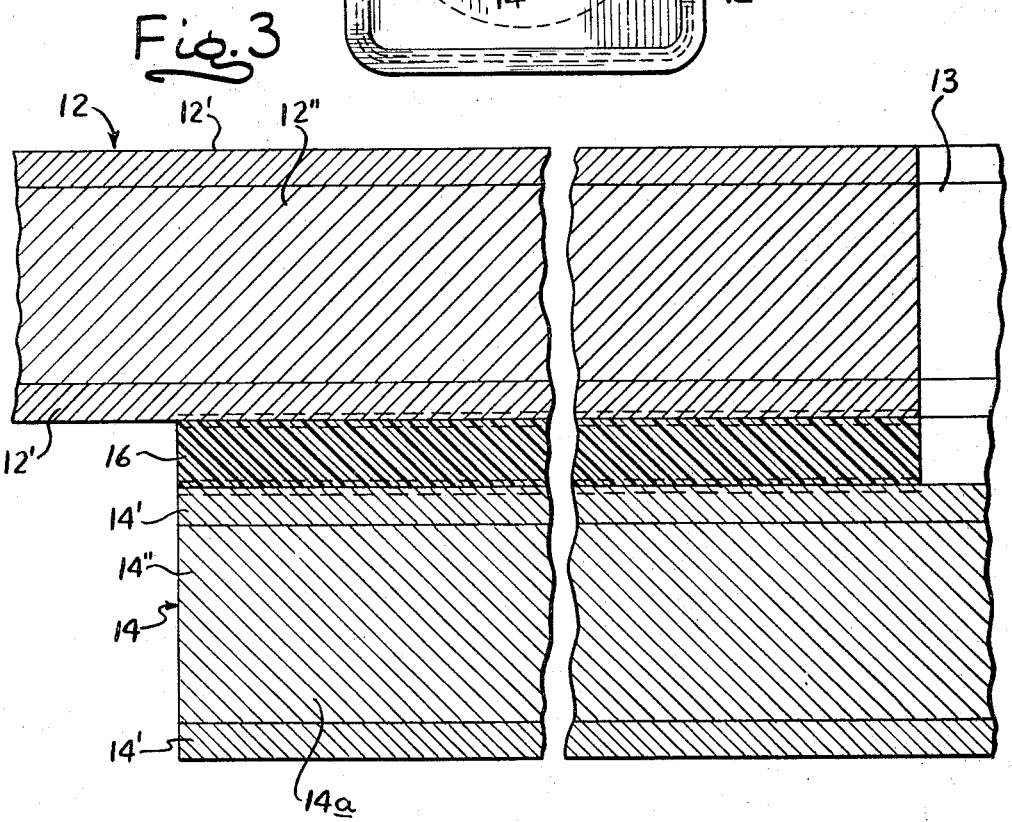
FIG. 3 is a greatly enlarged fragmentary view of the upper portion of the battery shown in FIG. 1.

As previously indicated, the inner and outer members 12 and 14 of the cover assembly are formed into an integral assembly prior to the connection thereof to the casing body. The members 12 and 14 are insulated from one another by means which forms, in addition, a seal and a bond between the members. This means is a neoprene rubber layer 16 which is vulcanized in place between the members to form an intimate molecular bond with the metal surface of the inner and outer members. The insulating and bonding layer 16 may, for example, be 0.0010 inch thick. Neoprene rubber has excellent insulating and sealing qualities, will adhere extremely well when vulcanized in place against nickel and is impervious to potassium hydroxide. The neoprene rubber layer 16 is applied to the confronting surfaces of the inner and outer members 12 and 14 in an uncured state and then vulcanized at a temperature of about 315° F. for about 10 minutes. FIG. 3 illustrates the neoprene layer 16 in its vulcanized state adhered to the nickel plating 12' and 14' of the steel sheet metal 12" and 14" of the outer and inner members 12 and 14.

Due to the physical relationship between the outer and inner members, the inner member will deflect outwardly toward the outer member to maintain the seal therebetween formed by the neoprene layer 16.

When the illustrated outer member 12 of the cover assembly is welded or otherwise secured to the casing body, the outer portion 14a of the inner member 14 presses against the battery plate 4b to make good electrical contact therewith and to hold the battery plates securely in place within the battery casing. The outwardly projecting portion 14b of the inner member forms an exposed battery terminal. The other terminal of the battery is the casing body 2a.

It should be understood that numerous modifications may be made in the most preferred form of the invention described above without deviating from the broad aspects of the invention. Thus, the present invention is applicable to a wide variety of batteries other than nickel-cadmium batteries. Also the invention is applicable to the provision of insulated seals at both ends of a battery casing and to the provision of a number of (instead of one) terminal forming insulated sections on a cover or end wall member which is to be sealed to the open end of a battery housing.

The term "non-insulating joint" used in the claims for describing the joint between the outer member 12 and the side walls 10 of the casing body is intended to cover not only a metal to metal contact therebetween, but also a joint including a thin rubber gasket as described above which forms an inadequate insulator.

I claim:

1. A battery including an open-end casing body having metal side walls and a metal end wall, a stack of battery plates within said casing body which fit through the open end thereof, an electrolyte for producing a voltage of opposite polarity across said plates, said plates extending parallel to said casing body end wall and the outermost plates of the assembly being of opposite polarity, the plate nearest said end wall contacting said casing body end wall and the plate nearest the open end of said casing body being positioned contiguous to the open end of said casing body, and an integral cover assembly comprising an outer metal member connected through a liquid tight, non-insulating joint to the open end of said casing body, said outer metal member having an opening in the central portion thereof, and an inner metal terminal member comprising an outer portion positioned adjacent the inner surface of said outer member and an outwardly projecting central portion passing through, and in spaced relation to the defining edges of, said opening, and an insulating layer impervious to the electrolyte bonding said inner terminal member to the inside surface of said outer member over an appreciable area thereof, and said outer portion of said inner terminal member pressing against the battery plate nearest the open end of said casing body to sandwich the plates between the casing body end wall and the inner terminal member of said cover assembly.

2. A battery including an open-end casing body having conductive side walls and a conductive end wall, a stack of battery plates within said casing body, the plates extending parallel to said casing body end wall, and an integral cover assembly over the open end of said casing body, said cover assembly comprising an outer conductive member connected through a liquid tight non-insulating joint to the open end of said casing body, said outer conductive member having an opening in the central portion thereof and an inner conductive terminal member comprising, an outer portion positioned adjacent the inner surface of said outer member and an outwardly projecting central portion passing through, and in spaced relation to the defining edges of, said opening, and an insulating layer impervious to the electrolyte bonded between said inner terminal member and the inside of said outer member.

3. The battery of claim 2 wherein the outermost plates of said stack of plates are of opposite polarity, the plate nearest said end wall contacting said casing body.

4. The battery of claim 2 wherein said casing body end wall is of rectangular shape and said casing body side walls extend transversely from the margins of said end wall, said side walls terminating in a flange, and said outer conductive member of said cover assembly being welded to said outwardly extending flange of said casing body.

5. The battery of claim 2 wherein the plate nearest the open end of said casing body is positioned contiguous to the open end of said casing body, and said outer portion of said inner terminal member presses against the battery plate nearest the open end of said casing body to sandwich the plates between the casing body end wall and the inner terminal member of said cover assembly.

References Cited by the Examiner
UNITED STATES PATENTS

| | | | |
|---|---|---|---|
| 2,580,664 | 1/1952 | Drummond | 136—133 |
| 2,606,942 | 8/1952 | Bonin | 136—133 |
| 2,850,558 | 9/1958 | Urry | 136—133 |
| 3,105,178 | 9/1963 | Meyers | 136—111 |

WINSTON A. DOUGLAS, *Primary Examiner.*

D. L. WALTON, *Assistant Examiner.*